US012755657B2

(12) United States Patent
Noichi et al.

(10) Patent No.: US 12,755,657 B2
(45) Date of Patent: Oct. 6, 2026

(54) DISPLAY DEVICE

(71) Applicant: Sharp Kabushiki Kaisha, Sakai City (JP)

(72) Inventors: Shunsuke Noichi, Sakai City (JP); Noriyuki Tanaka, Sakai City (JP); Daiji Kitagawa, Sakai City (JP); Tatsuhiko Suyama, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 19/391,063

(22) Filed: Nov. 17, 2025

(65) Prior Publication Data

US 2026/0141830 A1 May 21, 2026

(30) Foreign Application Priority Data

Nov. 20, 2024 (JP) ................................ 2024-202438

(51) Int. Cl.

*G09G 3/00* (2006.01)
*G09G 3/3208* (2016.01)
*G09G 3/36* (2006.01)

(52) U.S. Cl.

CPC .......... *G09G 3/001* (2013.01); *G09G 3/3208* (2013.01); *G09G 3/36* (2013.01); *G09G 2310/0297* (2013.01); *G09G 2320/068* (2013.01); *G09G 2380/10* (2013.01)

(58) Field of Classification Search

None

See application file for complete search history.

(56) References Cited

U.S. PATENT DOCUMENTS

2009/0279005 A1 11/2009 Fukushima et al.
2022/0400248 A1* 12/2022 Kusafuka ............ H04N 13/351
2024/0219757 A1* 7/2024 Lee ..................... G02B 6/0076

FOREIGN PATENT DOCUMENTS

WO 2006109498 A1 10/2006

* cited by examiner

*Primary Examiner* — Stephen T. Reed

(74) *Attorney, Agent, or Firm* — Keating & Bennett, LLP

(57) ABSTRACT

A display device comprises a switch configured to switch between: a first mode for connecting only one of a left-pixel signal line or a right-pixel signal line to a black voltage line and connecting an other one of the left-pixel signal line or the right-pixel signal line to a video signal line; and a second mode for connecting both the left-pixel signal line and the right-pixel signal line to the video signal line.

8 Claims, 13 Drawing Sheets

WIDE VIEWING ANGLE MODE

DISPLAY DEVICE

TECHNICAL FIELD

The present disclosure relates to a display device that presents a left image viewable from the left of a display surface and simultaneously presents a right image viewable from the right of the display surface.

BACKGROUND ART

A dual-view display device known in the art presents a left image viewable from the left of a display surface and simultaneously presents a right image viewable from the right of the display surface.

The display device has: a wide viewing angle mode for displaying a common image as the left image and the right image; and a narrow viewing angle mode for displaying a full black image either as the left image or as the right image (International Publication No. WO/2006/109498).

Such a display can respond to needs for: presenting the same screen in two directions in the wide viewing angle mode for normal use; and presenting a full black image only to the driver in the narrow viewing angle mode so as to provide a narrow viewing angle only in a case where the narrow viewing angle is desirable thereby cancelling a function of presenting separate screens in the two directions of the right and the left.

SUMMARY

Technical Problem

A problem of the above known art is that, because the separate images have to be displayed in the two directions of the right and the left, the dual-view display panel requires twice as many driver integrated circuit (IC) components and image interfaces as those for a non-dual-view display panel with the same resolution.

An aspect of the present disclosure sets out to provide a dual-view display device in a simple structure.

Solution to Problem

In order to solve the above problem, a display device according to an aspect of the present disclosure relates to a display device that presents a left image viewable from left of a display surface and presents a right image viewable from right of the display surface. The display device includes: a plurality of left pixel columns each including a plurality of left pixels that displays the left image; a plurality of right pixel columns each including a plurality of right pixels that displays the right image; a parallax barrier that blocks light traveling from the left pixels toward the right and light traveling from the right pixels toward the left; a left-pixel signal line provided for each of the plurality of left pixel columns and connected in common to the plurality of left pixels included in each left pixel column; a right-pixel signal line provided for each of the plurality of right pixel columns and connected in common to the plurality of right pixels included in each right pixel column; a black voltage line that supplies a black voltage to cause either the plurality of left pixels or the plurality of right pixels to display a black image; a video signal line that supplies a video signal to cause the left pixels and the right pixels to display a common image as the left image and the right image; and a switch that switches between: a first mode for connecting only one of the left-pixel signal line or the right-pixel signal line to the black voltage line and connecting an other one of the left-pixel signal line or the right-pixel signal line to the video signal line; and a second mode for connecting both the left-pixel signal line and the right-pixel signal line to the video signal line.

Advantageous Effect

An aspect of the present disclosure can provide a dual-view display device in a simple structure.

DESCRIPTION OF EMBODIMENTS

First Embodiment

An embodiment of the present disclosure will be described below in detail.

Figure 1:
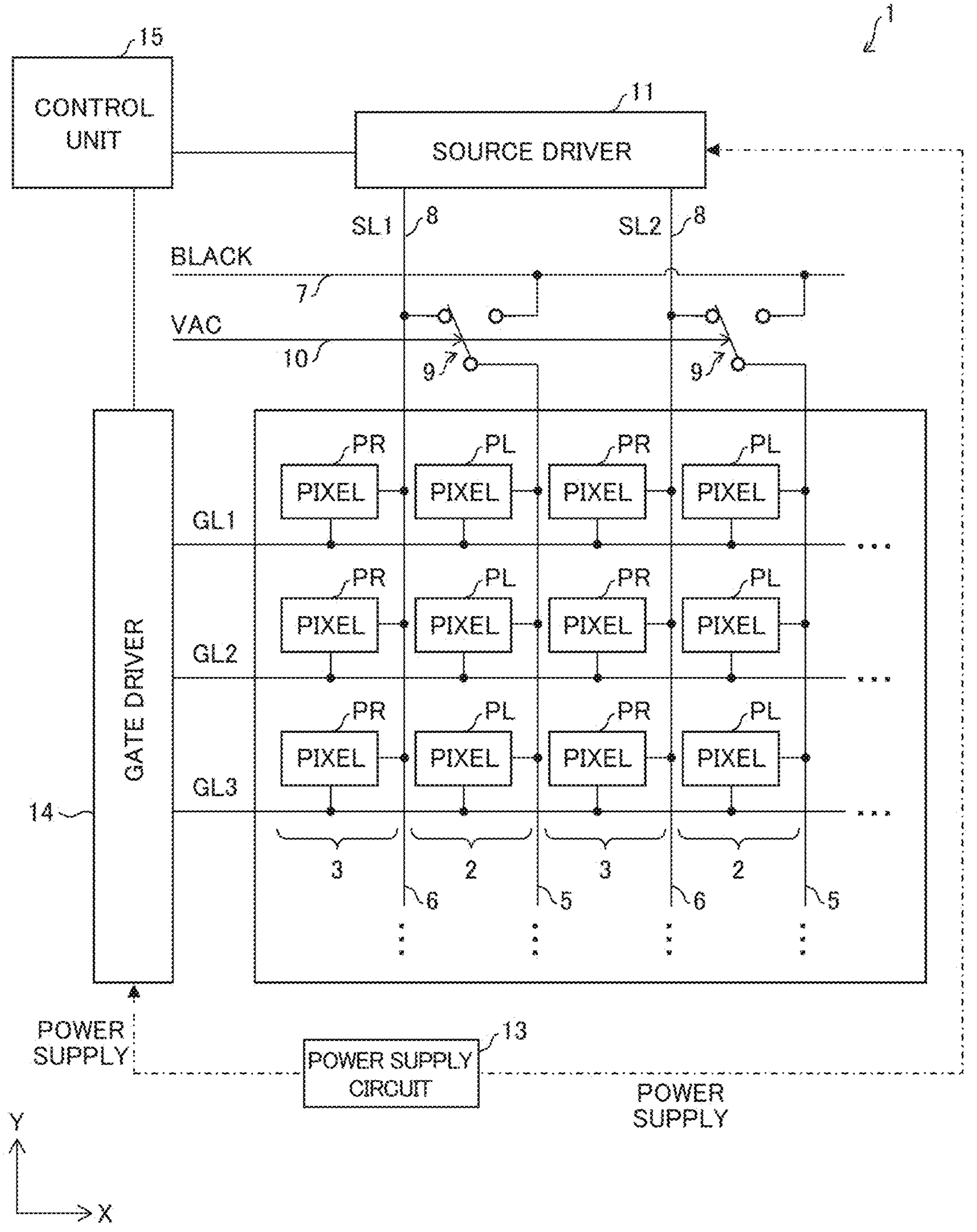
FIG. 1 illustrates a circuit diagram of a display device according to a first embodiment in a wide viewing angle mode.
Figure 2:
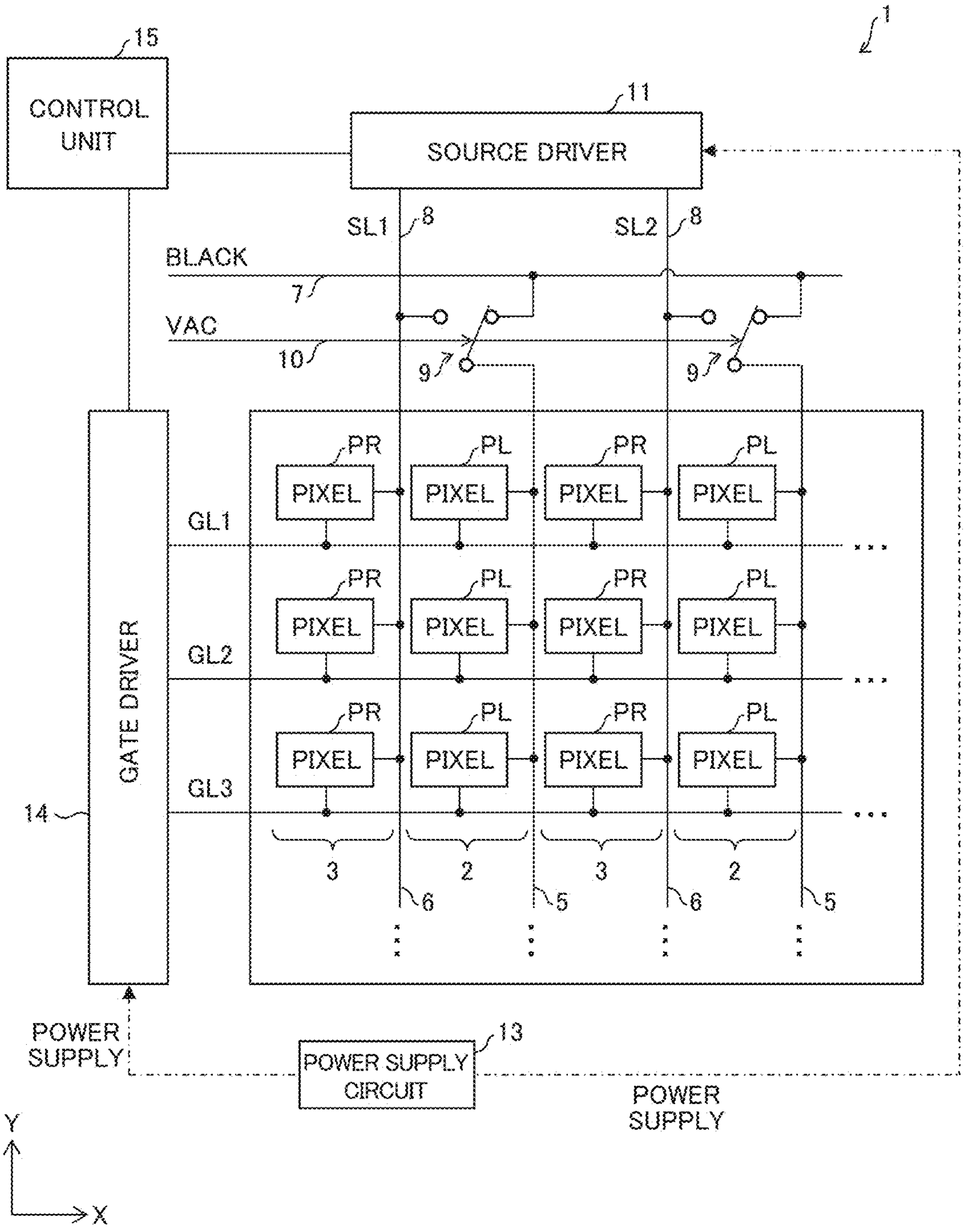
FIG. 2 illustrates a circuit diagram of the display device in a narrow viewing angle mode.
Figure 3:
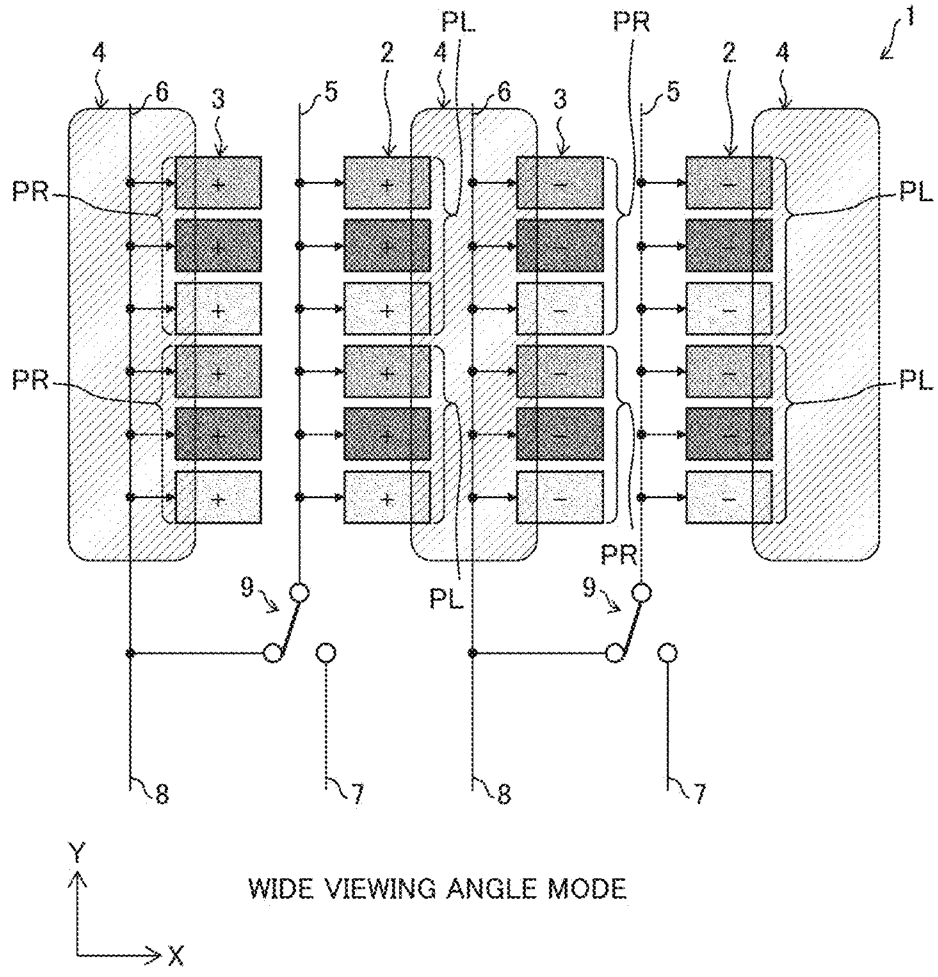
FIG. 3 illustrates an essential section of the circuit diagram of the display device in the wide viewing angle mode.
Figure 4:
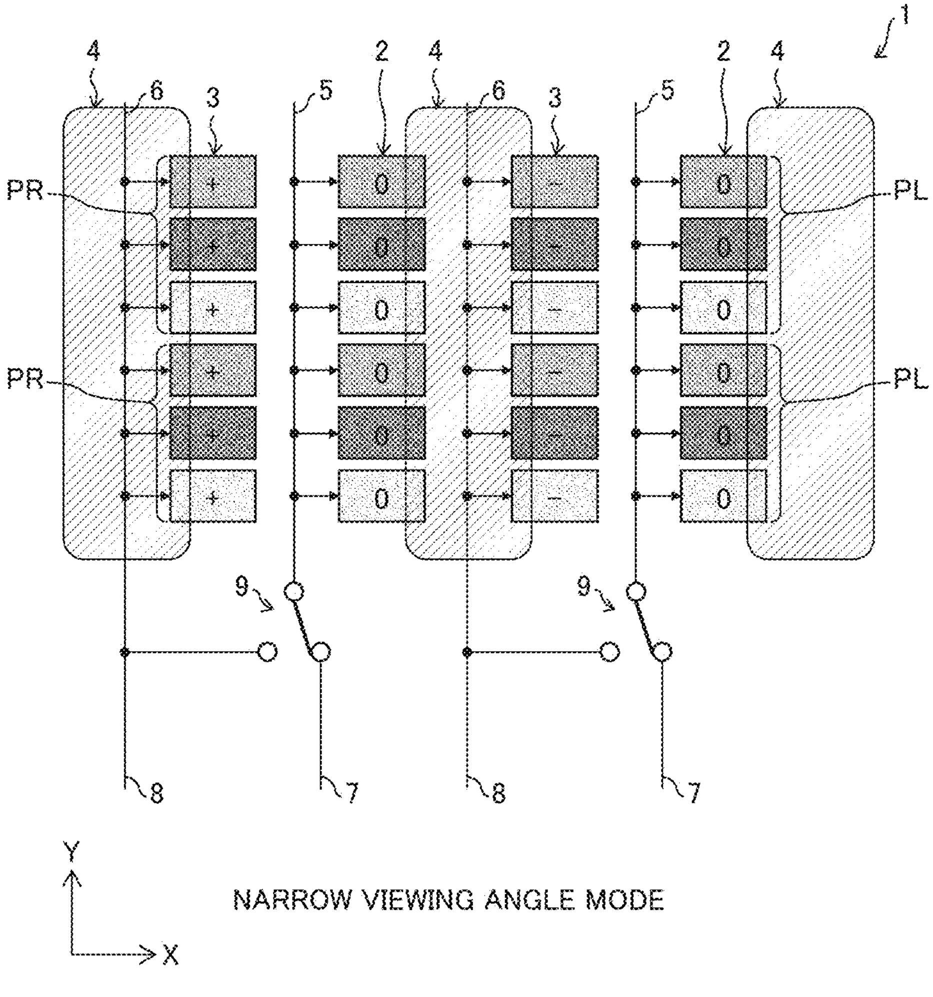
FIG. 4 illustrates an essential section of the circuit diagram of the display device in the narrow viewing angle mode.
Figure 5:
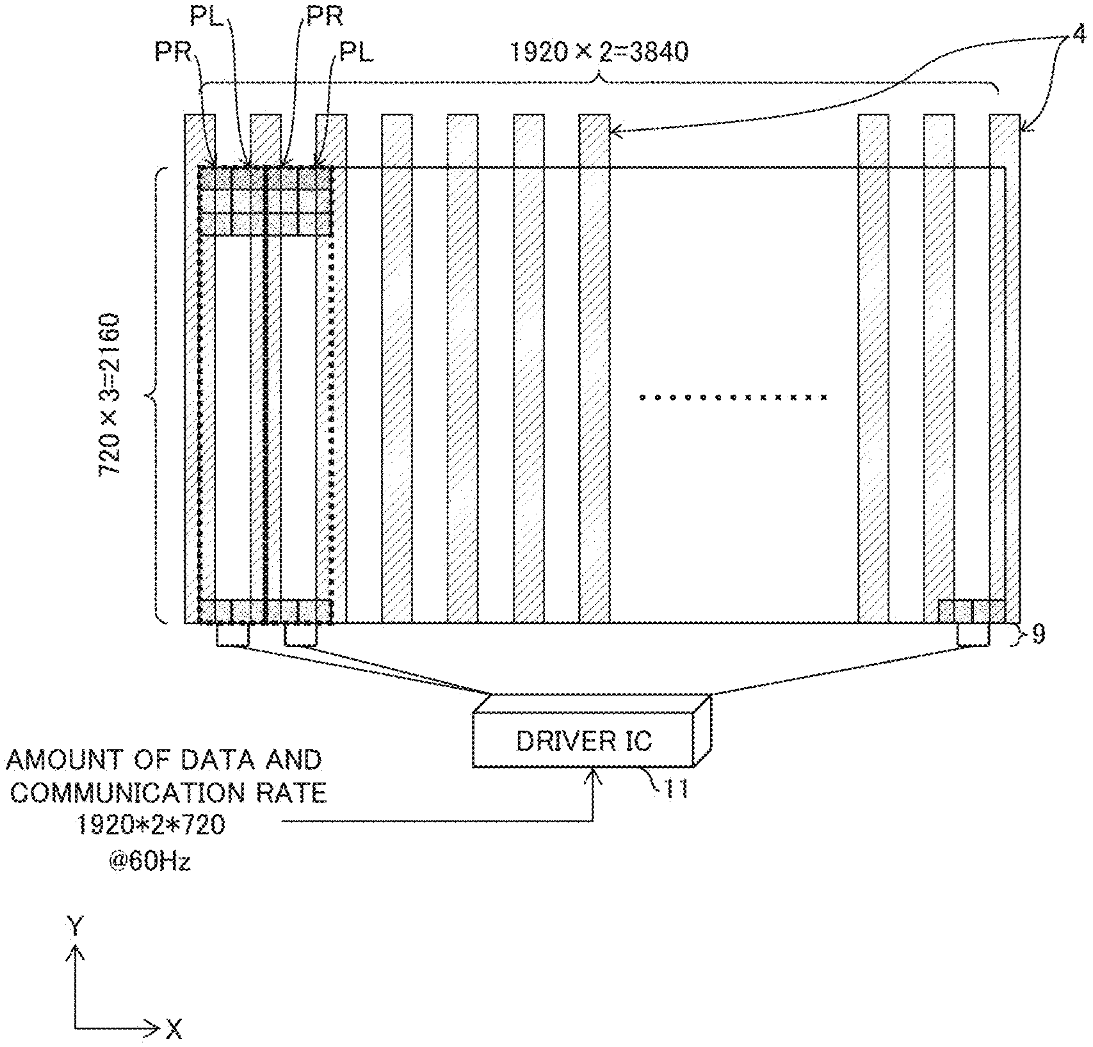
FIG. 5 illustrates a schematic plan view of the display device.
Figure 6:
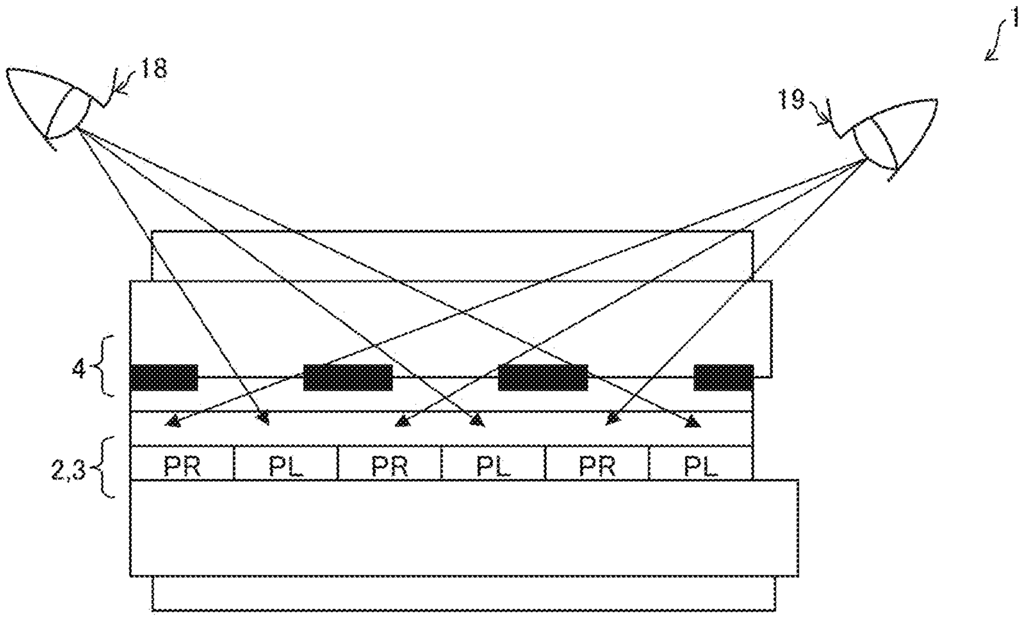
FIG. 6 illustrates a cross-sectional view of the display device.

FIG. 1 illustrates a circuit diagram of a display device 1 according to a first embodiment in a wide viewing angle mode. FIG. 2 illustrates a circuit diagram of the display device 1 in a narrow viewing angle mode. FIG. 3 illustrates an essential section of the circuit diagram of the display device 1 in the wide viewing angle mode. FIG. 4 illustrates an essential section of the circuit diagram of the display device 1 in the narrow viewing angle mode. FIG. 5 illustrates a schematic plan view of the display device 1. FIG. 6 illustrates a cross-sectional view of the display device.

The display device 1 presents a left image viewable from left of a display surface and simultaneously presents a right image viewable from right of the display surface.

As illustrated in, for example, FIGS. 1 and 2, the display device 1 includes: a plurality of left pixel columns 2 each including a plurality of left pixels PL that displays a left image; and a plurality of right pixel columns 3 each including a plurality of right pixels PR that displays a right image.

As illustrated in, for example, FIGS. 3 and 4, the display device 1 includes a parallax barrier 4 that blocks light traveling from the left pixels PL toward the right and light traveling from the right pixels PR toward the left.

As illustrated in, for example, FIGS. 1 and 2, the display device 1 includes: a left-pixel signal line 5 provided for each of the plurality of left pixel columns 2 and connected in common to the plurality of left pixels PL included in each left pixel column 2; a right-pixel signal line 6 provided for each of the plurality of right pixel columns 3 and connected in common to the plurality of right pixels PR included in each right pixel column 3; a black voltage line 7 that supplies a black voltage BLACK to cause either the plurality of left pixels PL or the plurality of right pixels PR to display a black image; and a video signal line 8 that supplies a video signal SL1 and a video signal SL2 to cause the left pixels PL and the right pixels PR to display a common image as the left image and the right image.

Then, the display device 1 includes a switch 9 that switches between: the narrow viewing angle mode (a first mode) for connecting only one of the left-pixel signal line 5 or the right-pixel signal line 6 to the black voltage line 7 and connecting an other one of the left-pixel signal line 5 or the right-pixel signal line 6 to the video signal line 8 as illustrated in, for example, FIG. 2; and the wide viewing angle mode (a second mode) for connecting both the left-pixel signal line 5 and the right-pixel signal line 6 to the video signal line 8 as illustrated in, for example, FIG. 1.

One of the left-pixel signal line 5 or the right-pixel signal line 6 is always connected to the video signal line 8. The switch 9 switches whether to connect an other one of the left-pixel signal line 5 or the right-pixel signal line 6 either to the black voltage line 7 or to the video signal line 8.

In the examples of FIGS. 1 to 4, the right-pixel signal line 6 is always connected to the video signal line 8 in both the wide viewing angle mode and the narrow viewing angle mode. Then, the switch 9 switches between the narrow viewing angle mode in which the left-pixel signal line 5 is connected to the black voltage line 7 and the wide viewing angle mode in which the left-pixel signal line 5 is connected to the video signal line 8.

As illustrated in, for example, FIGS. 1 and 2, the display device 1 further includes a switch signal line 10 that supplies the switch 9 with a switch signal VAC for switching connection targets with the switch 9.

As illustrated in, for example, FIGS. 1 and 2, the display device 1 further includes a source driver 11 that outputs the video signal SL1 and the video signal SL2.

The display device 1 may include a self-luminous display. In this case, the black voltage may include a voltage of a black signal level for a self-luminous element provided for the self-luminous display.

The display device 1 may include a normally-black liquid crystal display. In this case, the black voltage may include a voltage of a Vcom potential.

As illustrated in, for example, FIGS. 1 and 2, the display device 1 further includes: a gate driver 14 that supplies the left pixels PL and the right pixels PR with scan signals GL1, GL2, and GL3; a control unit 15 that controls the source driver 11 and the gate driver 14; and a power supply circuit 13 that supplies the source driver 11, the gate driver 14, and the control unit 15 with power.

As illustrated in FIGS. 3 and 4, the pixels PL and PR of the display device 1 are arranged in horizontal stripes of RGB. Each of the pixels PL and PR includes: a subpixel corresponding to a red light; a subpixel corresponding to a green light; and a subpixel corresponding to a blue light. The subpixels are arranged in a Y-direction.

As illustrated in FIG. 5, the display device 1 has a total of 3840 pixels arranged in an X-direction, including 1920 left pixels PL and 1920 right pixels PR. Then, a total of 2160 subpixels are arranged in the Y-direction, including 720 subpixels corresponding to a red light, 720 subpixels corresponding to a green light, and 720 subpixels corresponding to a blue light. An amount of data to be transmitted to the source driver 11 and a communication rate are 1920×2×720 @ 60 Hz.

Described below is an operation of the display device 1 in the above configuration.

First, as illustrated in FIGS. 1 and 3, in the wide viewing angle mode, the switch 9 connects the left-pixel signal line 5 to the video signal line 8 in accordance with the switch signal VAC from the switch signal line 10. Hence, the video signals SL1 and SL2 are supplied from the video signal line 8 to both the left pixels PL connected to the left-pixel signal line 5 and the right pixels PR connected to the right-pixel signal line 6. Thus, in the wide viewing angle mode, a common image is displayed as a left image and a right image.

Then, as illustrated in FIGS. 2 and 4, in the narrow viewing angle mode, the switch 9 connects the left-pixel signal line 5 to the black voltage line 7 in accordance with the switch signal VAC from the switch signal line 10. Hence, the black voltage BLACK is supplied to the left pixels PL connected to the left-pixel signal line 5, and the video signals SL1 and SL2 are supplied to the right pixels PR connected to the right-pixel signal line 6. Thus, in the narrow viewing angle mode, a black image is displayed as the left image, and an image based on the video signals SL1 and SL2 is displayed as the right image.

If the display device 1 is a self-luminous display, the black voltage BLACK can be a voltage of a black signal level for a self-luminous element provided to the self-luminous display. If the display device 1 is a normally-black liquid crystal display, the black voltage BLACK can be a voltage of a Vcom potential.

The parallax barrier 4 is provided on a surface of a display. As an application of the display, a dual-view display has been proposed. During the operation, the dual-view display is freely switched between a mode viewable only from one direction (the narrow viewing angle mode) and a mode viewable from multiple directions (the wide viewing angle mode). However, the dual-view display requires a large number of pixels for the display panel. Such a structure requires a large number of driver integrated circuits (ICs) corresponding to the source driver 11 and a high operation speed due to an increasing amount of data to be transmitted for the large number of pixels. Hence, the dual-view display is difficult to design, and, as a result, suffers high costs of components and low performance. Such problems make the dual-view display less appearing as a product.

The dual-view display is provided with the parallax barrier 4 to cover half of all the pixels on the display panel. Depending on a viewing angle, such a feature allows a person 18 to see only an uncovered portion (an image based on the pixels PL in FIG. 6) and a person 19 to see only a covered portion (an image based on the pixels PR in FIG. 6).

However, in order not to halve the amount of information to be displayed because the display has a dual-view configuration, the display requires twice as many pixels as those for a non-dual-view display.

An example in FIG. 6 shows that the person 18 cannot see an image based on the pixels PR, and can see only an image based on the pixels PL. The person 19 cannot see an image based on the pixels PL and can see only an image based on the pixels PR. Hence, in the example of FIG. 6, each person can simultaneously see an image with only three pixels among six pixels. If each of the person 18 and the person 19 desires to see six pixels simultaneously, the display is required to have twelve pixels.

Such a display having twice as many pixels usually requires twice as many display driver ICs. The problem is, because of this configuration, the amount of data to be transmitted increases such that the display is required to operate at a high speed.

In a case of specializing in controlling the viewing angle, as to the image with the pixels PL and the image with the pixels PR, the image with the pixels PR can be the same as the image with the pixels PL in the wide viewing angle mode, and only the image with the pixels PR can be the full black image in the narrow viewing angle mode.

Thus, in this embodiment, the switch 9 is provided in the display panel. In the wide viewing angle mode, the left-pixel signal line 5 and the right-pixel signal line 6 arranged side by side are connected together so that the same image (the image with the pixels PL is the same as the image with the pixels PR) is presented. In the narrow viewing angle mode, one of the left-pixel signal line 5 or the right-pixel signal line 6 arranged side by side is connected to the Vcom potential for the normally-black liquid crystal display (i.e., connected to the black signal level for the self-luminous display including organic light-emitting diodes (OLEDs)). Hence, the image with the pixels PR is displayed in full black.

That is, the display panel includes therein the switch 9 that selects, with the switch signal VAC, either the left-pixel signal line 5 or the right-pixel signal line 6 (i.e., the left-pixel signal line 5 in the examples of FIGS. 1 and 2) arranged side by side.

If the wide viewing angle mode is selected, as illustrated in FIG. 1, an output of one source driver 11 (e.g., the video signal SL1 in FIG. 1) is connected to both the left-pixel signal line 5 and the right-pixel signal line 6, using the switch 9. As a result, the left image with the left pixel column 2 and the right image with the right pixel column 3 are the same in a full screen (FIG. 1).

If the narrow viewing angle mode is selected, as illustrated in FIG. 2, an output of one source driver 11 (e.g., the video signal SL1 in FIG. 1) is connected, using the switch 9, only to the right-pixel signal line 6; whereas, the left-pixel signal line 5 is connected, using the switch 9, to the black voltage line 7 that supplies the black voltage BLACK corresponding to the black image.

For, for example, a normally-black liquid crystal display, the black voltage BLACK corresponds to the Vcom voltage. For, for example, OLEDs, the black voltage BLACK is a voltage of black signal corresponding to a 0-level gray scale. As a result, only the right image corresponding to the right pixels PR is displayed in a full screen, and the left image corresponding to the left pixels PL is displayed entirely in black (FIG. 2).

Such a feature eliminates the need for increasing the number of driver ICs for the dual-view display.

Furthermore, the feature also eliminates the need for preparing two kinds of video signal data for the image with the pixels PL and the image with the pixels PR. Similar to a know non-dual-view display, the dual-view display can operate at a communication speed for sending only one kind of video signal data for an image with pixels A.

Thus, the feature eliminates the need of special components for the two kinds of video signal data of the image with the pixels PL and the image with the pixels PR. Hence, the feature allows the display device to be formed of readily available components such as a local dimming controlling timing controller (TCON) using general-purpose matrix light-emitting diodes (LEDs).

Figure 7:
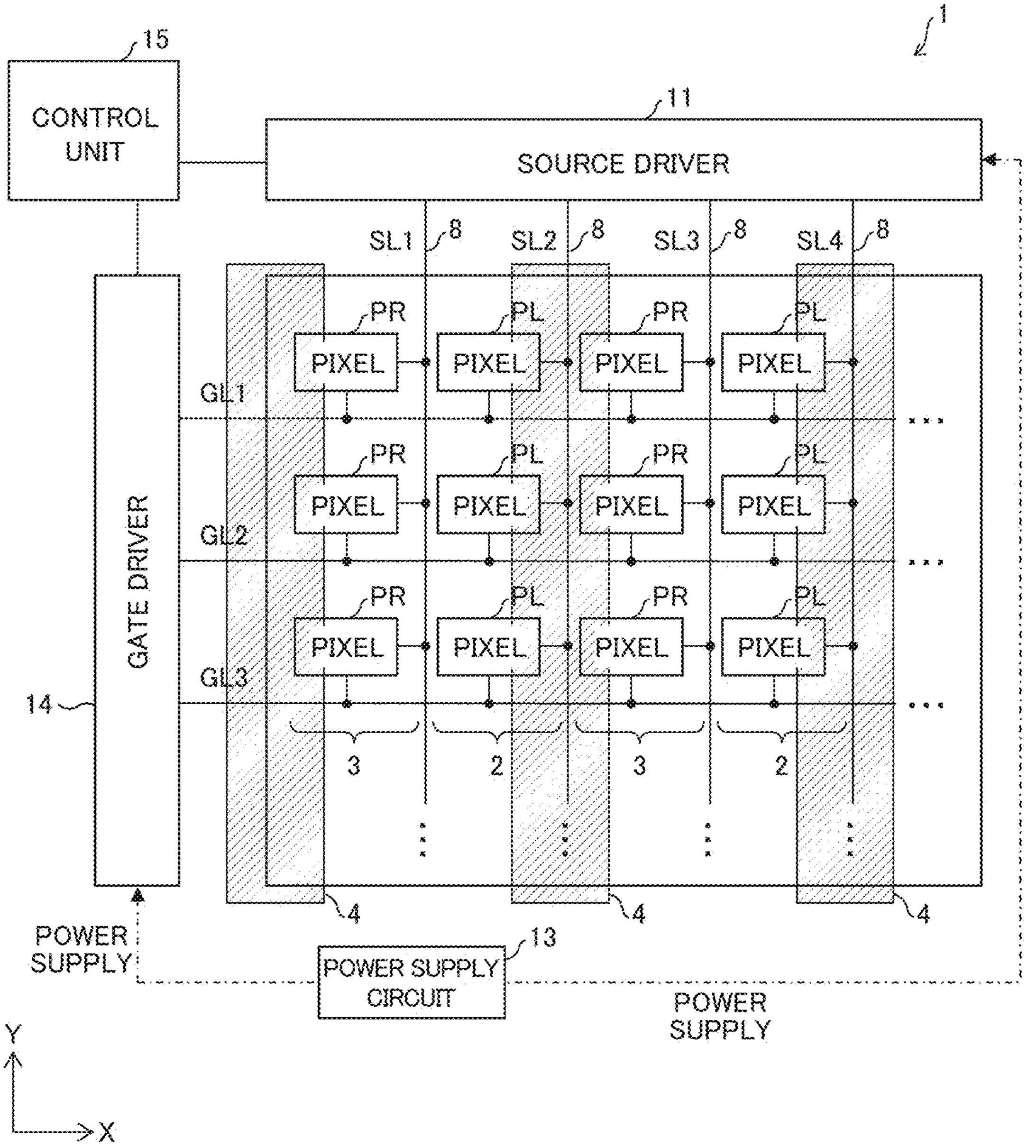
FIG. 7 illustrates a circuit diagram of a display device according to a comparative example.
Figure 8:
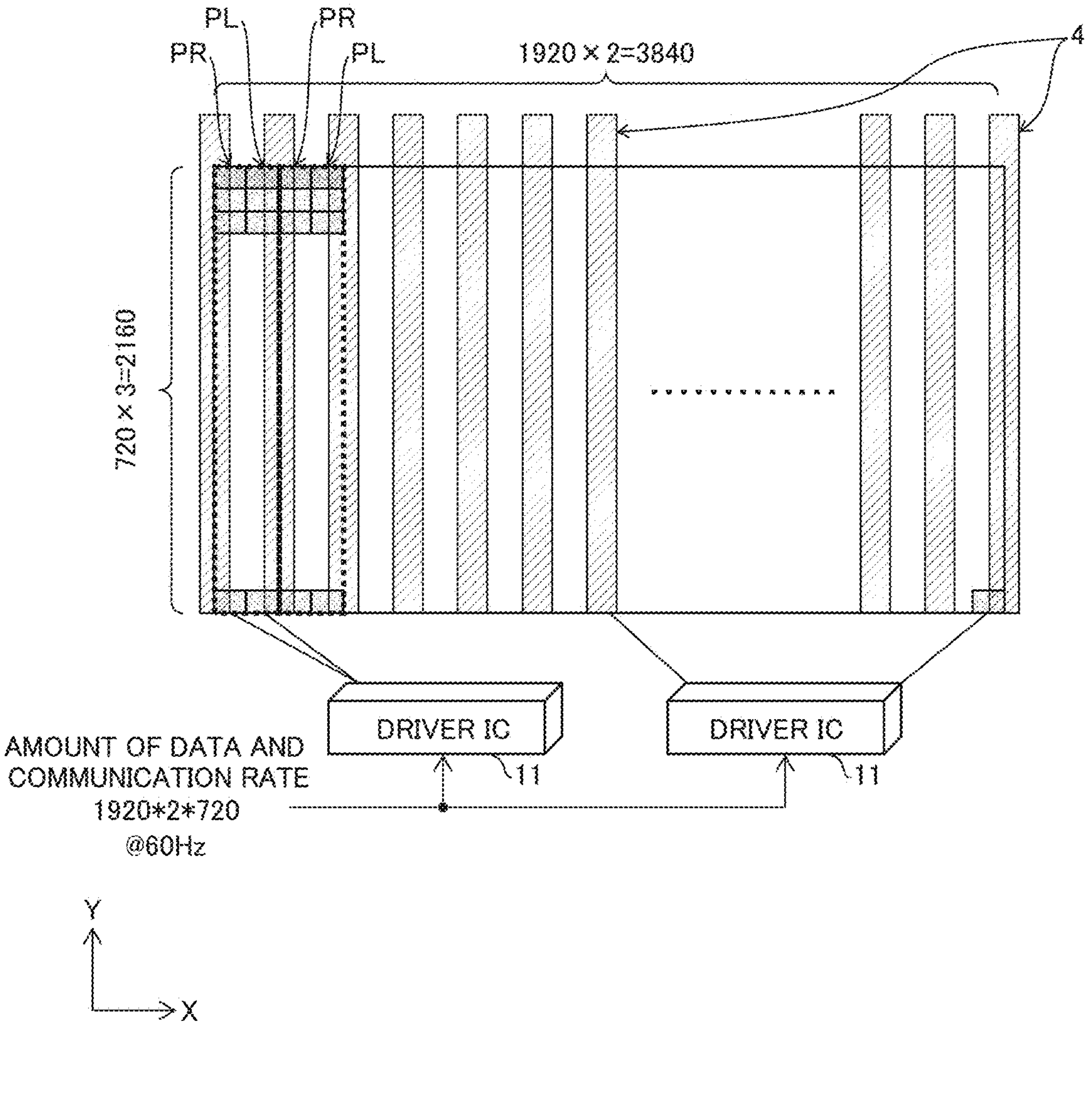
FIG. 8 illustrates a schematic plan view of the display device.

FIG. 7 illustrates a circuit diagram of a display device according to a comparative example. FIG. 8 illustrates a schematic plan view of the display device according to the comparative example.

Patent Document 1 discloses a mechanism of a dual-view display that can black out only a driver-side image in one display. In other words, the dual-view display can present the driver-side image different from a passenger-side image and other than the black-out image. As illustrated in FIG. 7, each of the left pixel columns 2 and the right pixel columns 3 is supplied with a corresponding one of a plurality of kinds of output signals such as the video signals SL1, SL2, . . . from the source driver 11.

Whereas, the application of this embodiment is limited to a viewing-angle control display having only the "wide viewing angle mode" in which the driver-side image is the passenger-side image and the "narrow viewing angle mode" in which an input image is displayed only toward the passenger and a full black image is displayed toward the driver. The display panel includes therein the circuit illustrated in FIGS. 1 and 2. Such features make it possible to produce a dual-view display including the source driver 11 with a small number of output terminals.

For example, the display device having the configuration illustrated in FIG. 8 according to the comparative example is replaced with the display device having the configuration illustrated in FIG. 5 according to this embodiment and provided with the switch 9. Hence, the number of the output terminals of the source driver 11 can be reduced to half, and the resulting dual-view display can be formed of as many driver ICs as those required for an original resolution (1920×720 in the examples of FIGS. 5 and 8). That is, if the dual-view display according to the comparative example illustrated in FIG. 8 requires two source drivers 11, the non-dual-view display requires one source driver 11. In contrast, in this embodiment illustrated in FIG. 5, only one source driver 11 is required even though the display is a dual-view display. As the number of driver ICs is reduced, unnecessary power can be reduced.

As in the case of the above situation regarding the number of driver ICs, the amount of data representing the video signal and sent to the source driver IC becomes equal to the amount of data representing a video signal required for the original resolution (1920×720 in the examples of FIGS. 5 and 8). Hence, the data can be transferred at the same rate. As the transfer rate of the data for the video signal is reduced, unnecessary power can be reduced.

As in the case of the above situation regarding the amount and the transfer rate of the data of the image signal, the amount of the data representing the video signal and sent to the source driver IC becomes equal to the amount of data representing a video signal required for the original resolution (1920×720 in the examples of FIGS. 5 and 8). Such a feature eliminates the need for providing an external circuit outside the source driver 11 to separately generate image data of a black image for the driver.

Second Embodiment

Another embodiment of the present disclosure will be described below. Note that, for convenience in description, like reference signs designate members having identical functions between this embodiment and the above embodiment. These members will not be elaborated upon repeatedly.

Figure 9:
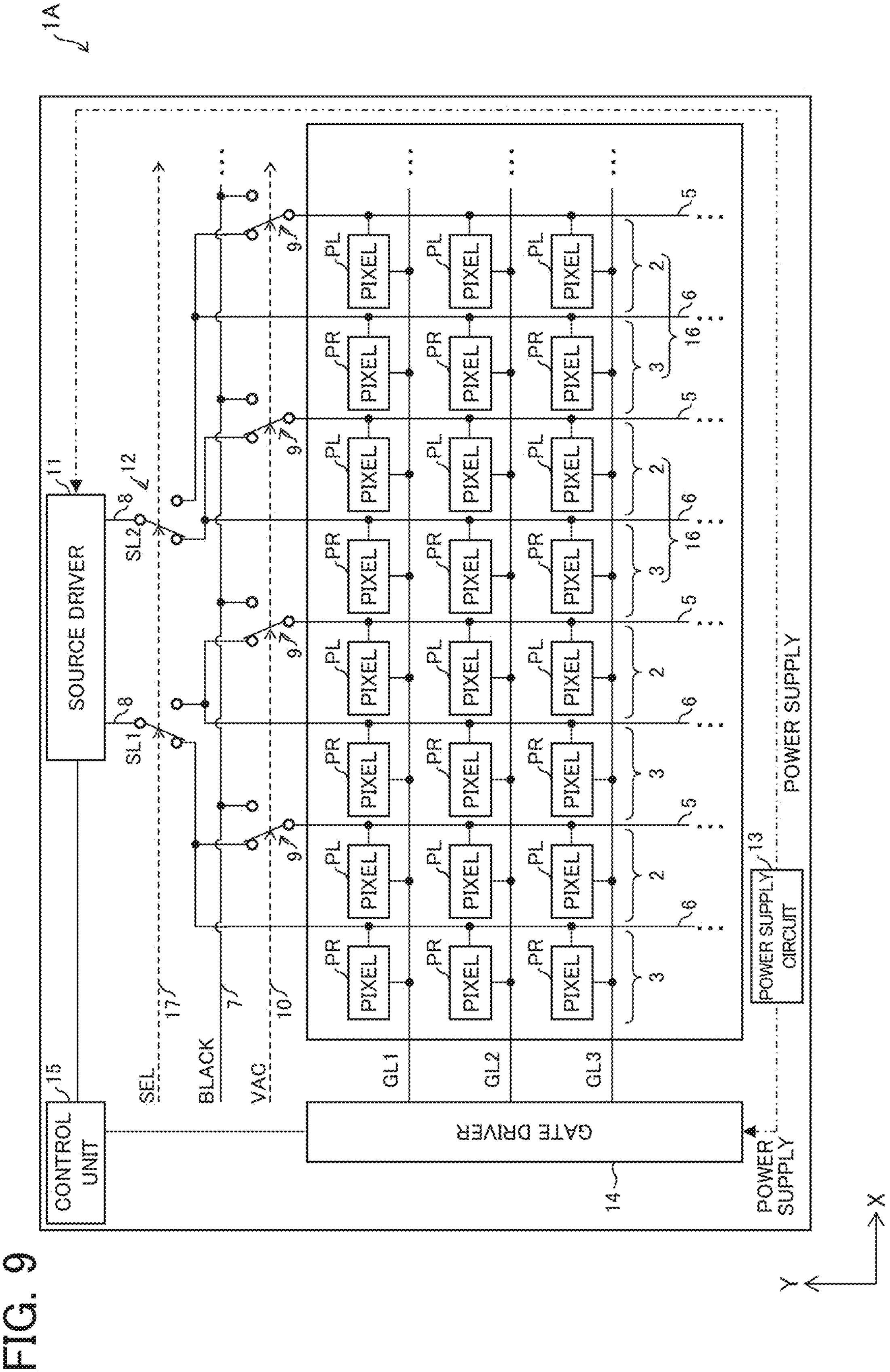
FIG. 9 illustrates a circuit diagram of a display device according to a second embodiment.

FIG. 9 illustrates a circuit diagram of a display device 1A according to a second embodiment.

The display device 1A includes the source driver 11 that outputs the video signal SL1 and the video signal SL2.

The display device 1A includes a plurality of pairs of the left pixel column 2 and the right pixel column 3. Then, the display device 1A further includes a demultiplexer switch 12 that distributes the video signals SL1 and SL2, which are output from the source driver 11, to any given pair among the plurality of pairs.

The display panel may include therein a combination of: the switch 9 capable of selecting, with the switch signal VAC, one of the left-pixel signal line 5 or the right-pixel signal line 6 (e.g., the left-pixel signal line 5 in FIG. 9); and the demultiplexer switch 12 that distributes an output, sent from the source driver 11, to a plurality of source buses so that the source driver 11 requires fewer output terminals.

FIG. 9 illustrates an example of the demultiplexer switch 12 that distributes an output, sent from the source driver 11, to two source buses. There is no theoretical restriction on further increasing the number of source buses for distributing the output of the source driver 11 to three or four source buses.

Third Embodiment

Yet another embodiment of the present disclosure will be described below. Note that, for convenience in description, like reference signs designate members having identical functions between this embodiment and the above embodiments. These members will not be elaborated upon repeatedly.

Figure 10:
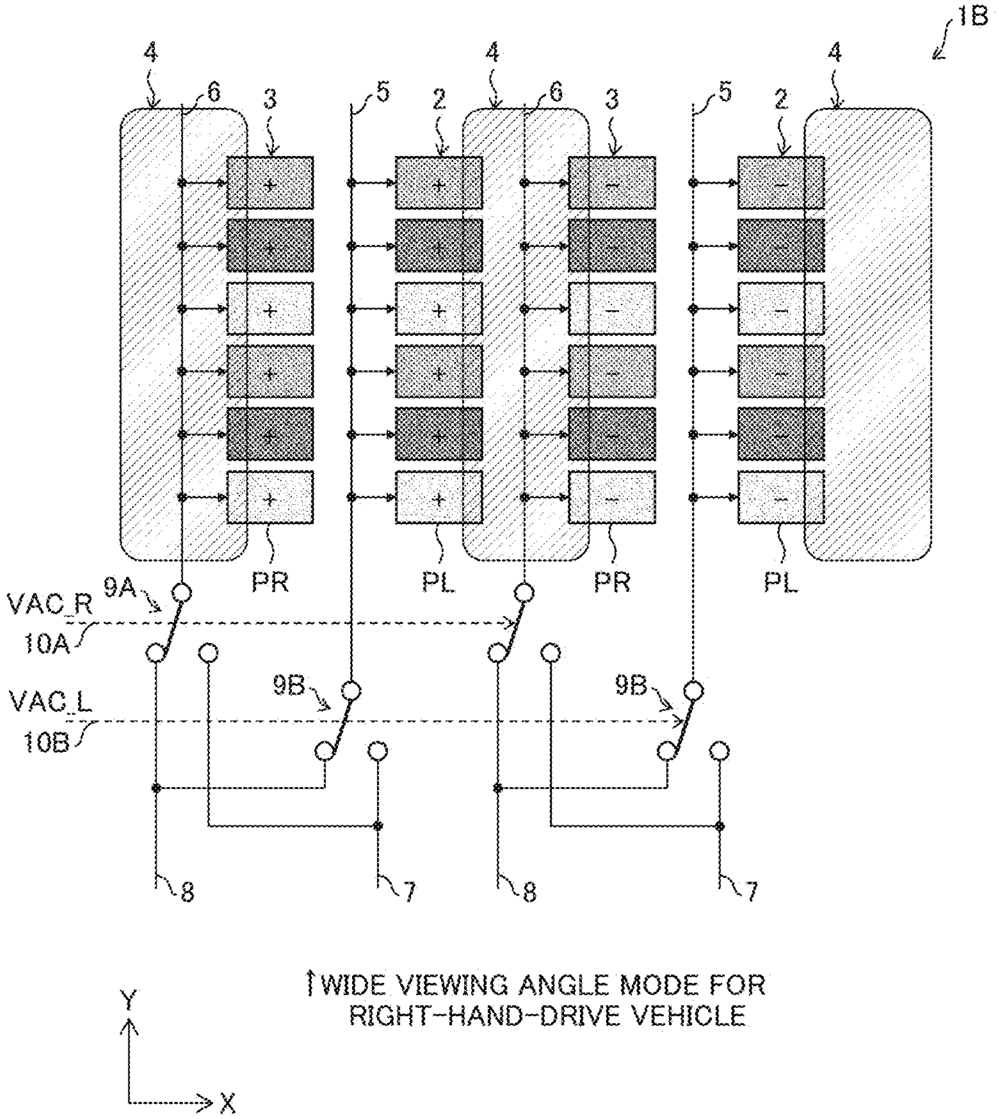
FIG. 10 illustrates an essential section of a circuit diagram of a display device according to a third embodiment in a wide viewing angle mode for a right-hand-drive vehicle.
Figure 11:
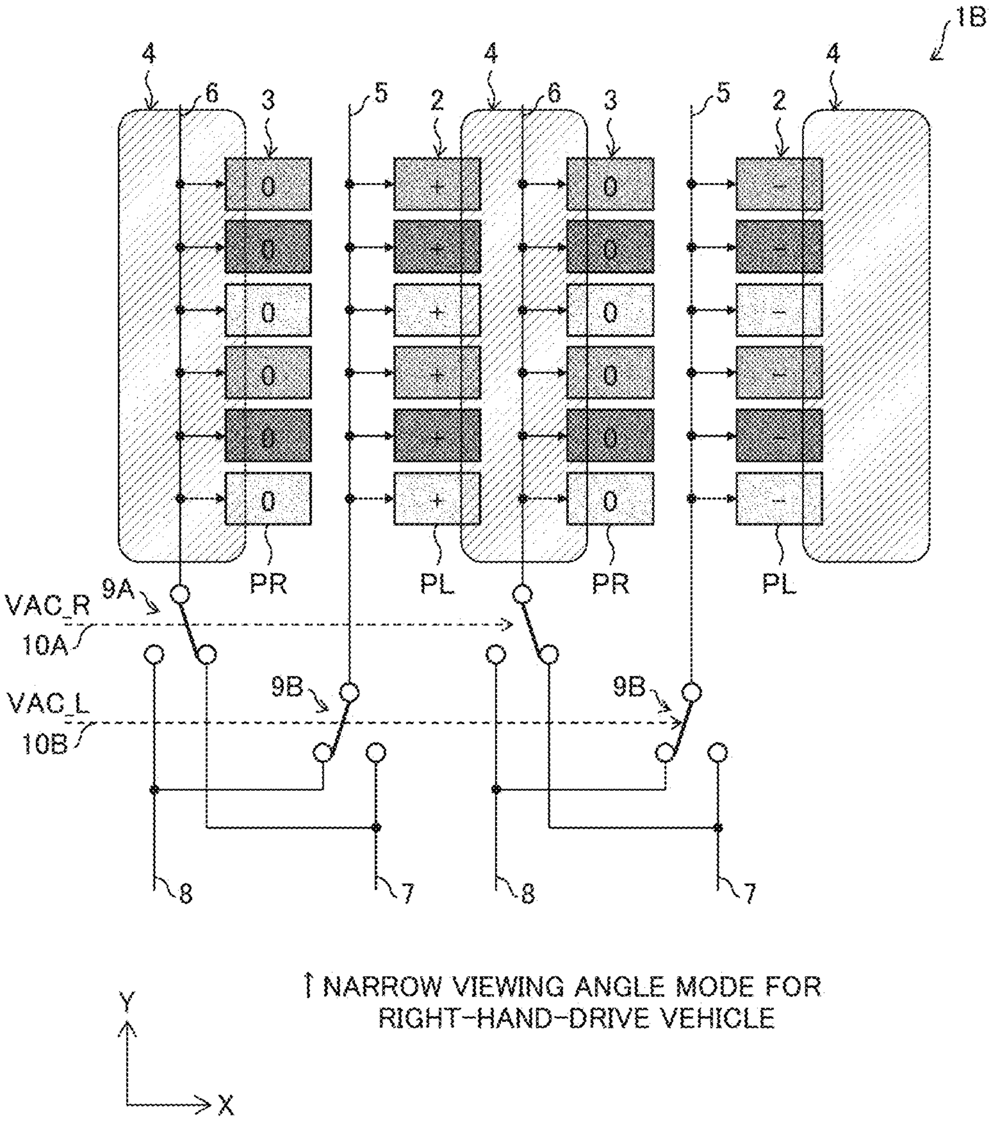
FIG. 11 illustrates an essential section of a circuit diagram of the display device in a narrow viewing angle mode for a right-hand-drive vehicle.
Figure 12:
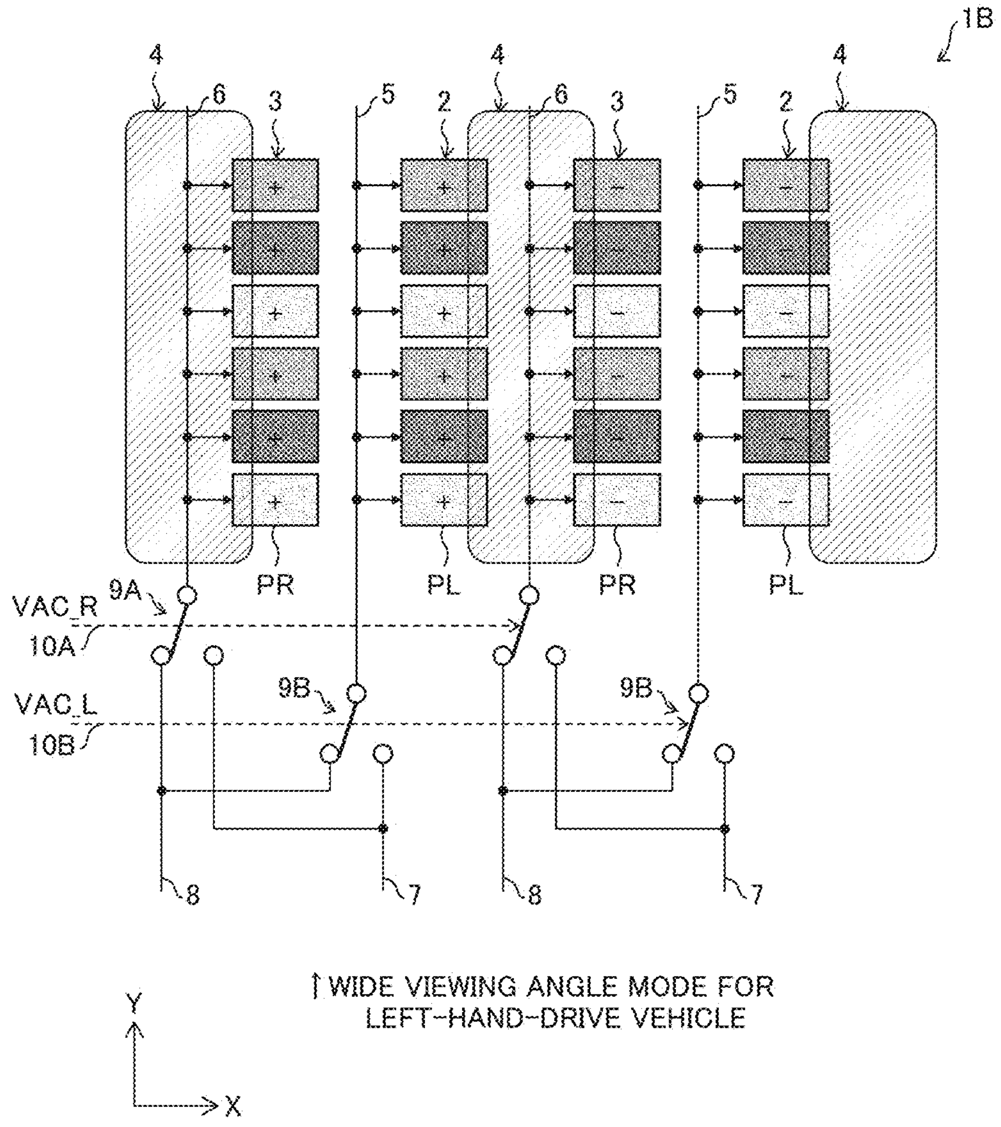
FIG. 12 illustrates an essential section of a circuit diagram of the display device in a wide viewing angle mode for a left-hand-drive vehicle.
Figure 13:
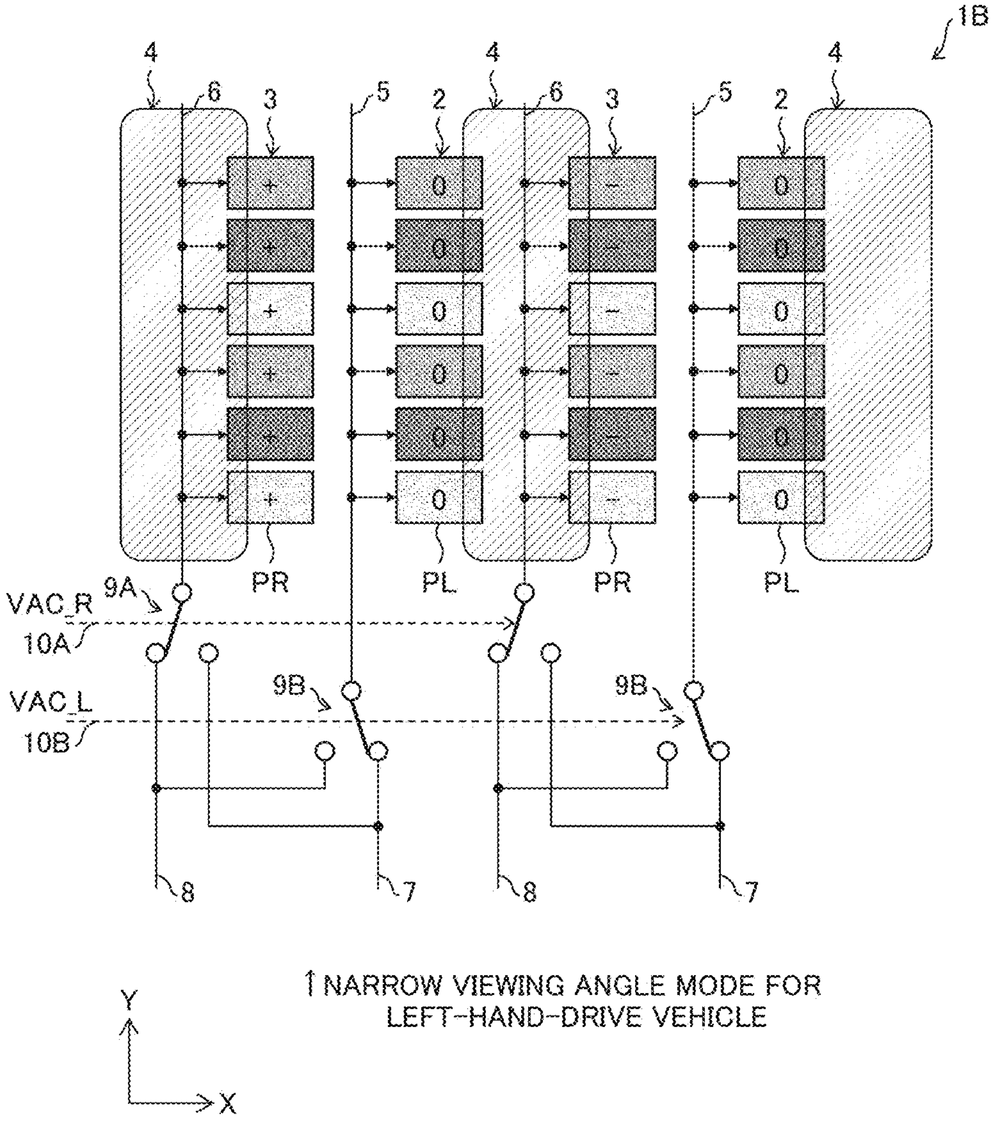
FIG. 13 illustrates an essential section of a circuit diagram of the display device in a narrow viewing angle mode for a left-hand-drive vehicle.

FIG. 10 illustrates an essential section of a circuit diagram of a display device 1B according to a third embodiment in a wide viewing angle mode for a right-hand-drive vehicle. FIG. 11 illustrates an essential section of a circuit diagram of the display device 1B in a narrow viewing angle mode for a right-hand-drive vehicle. FIG. 12 illustrates an essential section of a circuit diagram of the display device 1B in a wide viewing angle mode for a left-hand-drive vehicle. FIG. 13 illustrates an essential section of a circuit diagram of the display device 1B in a narrow viewing angle mode for a left-hand-drive vehicle.

As illustrated in FIGS. 10 to 13, the display device 1B includes a first switch 9A and a second switch 9B to serve as the switch. The second switch 9B switches whether to connect the left-pixel signal line 5 either to the black voltage line 7 or to the video signal line 8. The first switch 9A switches whether to connect the right-pixel signal line 6 either to the black voltage line 7 or to the video signal line 8.

As illustrated in FIGS. 10 to 13, the display device 1B further includes: a first switch signal line 10B that supplies the first switch 9B with a first switch signal VAC_L that switches whether to connect the left-pixel signal line 5 either to the black voltage line 7 or to the video signal line 8; and a second switch signal line 10A that supplies the first switch 9A with a second switch signal VAC_R that switches whether to connect the right-pixel signal line 6 either to the black voltage line 7 or to the video signal line 8.

As can be seen, the switch in the display panel controlled with the switch signal VAC may be increased to two systems as illustrated in FIGS. 10 to 13.

For example, in a case of an operation for the right-hand-drive vehicle illustrated in FIGS. 10 and 11, the switch signal VAC_L is fixed to the video signal line 8 even in the wide viewing angle mode illustrated in FIG. 10 and in the narrow viewing angle mode illustrated in FIG. 11, and the second switch 9B controlled with the switch signal VAC_L is set to always conduct a video signal. Such a feature allows a person in the left seat to always see the video. Then, the switch signal VAC_R is switched between the wide viewing angle mode and the narrow viewing angle mode. Such a feature makes it possible to switch between a video-viewable state and a video-unviewable state for a person in the right seat. As a result, the feature has an advantageous effect of encouraging the driver of a right-hand drive vehicle to feel obliged to look ahead while driving.

In a case of an operation for the left-hand-drive vehicle illustrated in FIGS. 12 and 13, the switch signal VAC_R is fixed to the video signal line 8, and the switch signal VAC_L is switched. Hence, the person in the right seat always sees the video. Whereas, the person in the left seat can select between the video-viewable state and the video-unviewable state. Such a feature has an advantageous effect of encouraging the driver of a left-hand drive vehicle to feel obliged to look ahead while driving.

One kind of such a display device 1B is produced and installed in both a right-hand-drive vehicle and a left-hand-drive vehicle, and the switch signal VAC_L and the switch signal VAC_R alone are changed. Hence, the display device 1B can be adapted to both the right-hand-drive vehicle and the left-hand-drive vehicle. Such a feature eliminates the need for separately producing display devices for right-hand-drive vehicles and left-hand-drive vehicles, thereby successfully reducing kinds of products related to the display devices and cutting production costs of the products.

SUMMARY

The display devices 1, 1A, and 1B according to an aspect of the present disclosure relates to the display devices 1, 1A, and 1B that present a left image viewable from left of a display surface and simultaneously presents a right image viewable from right of the display surface. The display devices 1, 1A, and 1B include: a plurality of left pixel columns 2 each including a plurality of left pixels PL that displays the left image; a plurality of right pixel columns 3 each including a plurality of right pixels PR that displays the right image; a parallax barrier 4 that blocks light traveling from the left pixels toward the right and light traveling from the right pixels toward the left; a left-pixel signal line 5 provided for each of the plurality of left pixel columns 2 and connected in common to the plurality of left pixels PL included in each left pixel column 2; a right-pixel signal line 6 provided for each of the plurality of right pixel columns 3 and connected in common to the plurality of right pixels PR included in each right pixel column 3; a black voltage line 7 that supplies a black voltage BLACK to cause either the plurality of left pixels PL or the plurality of right pixels PR to display a black image; a video signal line 8 that supplies video signals SL1, SL2, SL3, and SL4 to cause the left pixels PL and the right pixels PR to display a common image as the left image and the right image; and switches 9, 9A, and 9B that switch between: a first mode for connecting only one of the left-pixel signal line 5 or the right-pixel signal line 6 to the black voltage line 7 and connecting an other one of the left-pixel signal line 5 or the right-pixel signal line 6 to the video signal line 8; and a second mode for connecting both the left-pixel signal line 5 and the right-pixel signal line 6 to the video signal line 8.

Thanks to the above configuration, a dual-view display device can be produced in a simple structure.

As to the display devices 1 and 1A in a second aspect of the present disclosure according to the first aspect, one of the left-pixel signal line 5 or the right-pixel signal line 6 is preferably always connected to the video signal line 8, and the switch 9 preferably switches whether to connect an other one of the left-pixel signal line 5 or the right-pixel signal line 6 either to the black voltage line 7 or to the video signal line 8.

Thanks to the above configuration, the black image can be displayed with either the left pixels or the right pixels in the narrow viewing angle mode.

The display devices 1, 1A, and 1B in a third aspect of the present disclosure according to the first or second aspect preferably further include switch signal lines 10, 10A, and 10B that supply the switches 9, 9A, and 9B with a switch signal VAC for switching connection targets with the switches 9, 9A, and 9B.

Thanks to the above configuration, the first mode successfully involves connecting only one of the left-pixel signal line or the right-pixel signal line to the black voltage line and connecting an other one of the left-pixel signal line or the right-pixel signal line to the video signal line, and the second mode successfully involves connecting both the left-pixel signal line and the right-pixel signal line to the video signal line.

The display device 1A in a fourth aspect of the present disclosure according to the first or second aspect preferably further includes: a source driver 11 that outputs the video signals SL1 to SL4; a plurality of pairs of the left pixel column 2 and the right pixel column 3; and a demultiplexer switch 12 that distributes the video signals SL1 to SL4, which are output from the source driver 11, to any given pair among the plurality of pairs.

Thanks to the above configuration, the number of output terminals for the source driver can be reduced.

The display device 1B in a fifth aspect of the present disclosure according to the first or second aspect preferably further includes a first switch 9A and a second switch 9B to serve as the switch. The first switch 9A preferably switches whether to connect the left-pixel signal line 5 either to the black voltage line 7 or to the video signal line 8, and the second switch preferably switches whether to connect the right-pixel signal line 6 either to the black voltage line 7 or to the video signal line 8.

Thanks to the above configuration, the display device can handle both: the wide viewing angle mode and the narrow viewing angle mode for a left-hand-drive vehicle; and the wide viewing angle mode for a right-hand-drive vehicle.

The display device 1B in a sixth aspect of the present disclosure according to the fifth aspect preferably further includes: a first switch signal line 10A that supplies the first switch 9A with a first switch signal VAC_R that switches whether to connect the left-pixel signal line 5 either to the black voltage line 7 or to the video signal line 8; and a second switch signal line 10B that supplies the second switch 9B with a second switch signal VAC_L that switches whether to connect the right-pixel signal line 6 either to the black voltage line 7 or to the video signal line 8.

Thanks to the above configuration, the first mode successfully involves connecting only one of the left-pixel signal line or the right-pixel signal line to the black voltage line and connecting an other one of the left-pixel signal line or the right-pixel signal line to the video signal line, and the second mode successfully involves connecting both the left-pixel signal line and the right-pixel signal line to the video signal line.

As to the display devices 1, 1A, and 1B in a seventh aspect of the present disclosure according to the first or second aspect, the display devices 1, 1A, and 1B preferably include a self-luminous display, and the black voltage BLACK preferably includes a voltage of a black signal level for a self-luminous element provided for the self-luminous display.

Thanks to the above configuration, a voltage of the black signal level for a self-luminous element can be used as image data for a black image. Such a feature eliminates the need for providing an external circuit outside the source driver to separately generate image data for the black image.

As to the display devices 1, 1A, and 1B in an eighth aspect of the present disclosure according to the first or second aspect, the display devices 1, 1A and 1B preferably include a normally-black liquid crystal display, and the black voltage preferably includes a voltage of a Vcom potential.

Thanks to the above configuration, a voltage of the Vcom potential can be used as image data for a black image. Such a feature eliminates the need for providing an external circuit outside the source driver to separately generate image data for the black image.

The present disclosure shall not be limited to the embodiments described above, and can be modified in various manners within the scope of claims. The technical aspects disclosed in different embodiments are to be appropriately combined together to implement another embodiment. Such an embodiment shall be included within the technical scope of the present disclosure. Moreover, the technical aspects disclosed in each embodiment may be combined together to achieve a new technical feature.

The invention claimed is:

1. A display device that presents a left image viewable from left of a display surface and presents a right image viewable from right of the display surface, the display device comprising:

a plurality of left pixel columns each including a plurality of left pixels that displays the left image;

a plurality of right pixel columns each including a plurality of right pixels that displays the right image;

a parallax barrier that blocks light traveling from the left pixels toward the right and light traveling from the right pixels toward the left;

a left-pixel signal line provided for each of the plurality of left pixel columns and connected in common to the plurality of left pixels included in each left pixel column;

a right-pixel signal line provided for each of the plurality of right pixel columns and connected in common to the plurality of right pixels included in each right pixel column;

a black voltage line that supplies a black voltage to cause either the plurality of left pixels or the plurality of right pixels to display a black image;

a video signal line that supplies a video signal to cause the left pixels and the right pixels to display a common image as the left image and the right image; and a switch configured to switch between: a first mode for connecting only one of the left-pixel signal line or the right-pixel signal line to the black voltage line and connecting an other one of the left-pixel signal line or the right-pixel signal line to the video signal line; and a second mode for connecting both the left-pixel signal line and the right-pixel signal line to the video signal line.

2. The display device according to claim 1, wherein one of the left-pixel signal line or the right-pixel signal line is always connected to the video signal line, and the switch switches whether to connect an other one of the left-pixel signal line or the right-pixel signal line either to the black voltage line or to the video signal line.

3. The display device according to claim 1, further comprising a switch signal line that supplies the switch with a switch signal for switching connection targets with the switch.

4. The display device according to claim 1, further comprising:

a source driver configured to output the video signal;

a plurality of pairs of the left pixel column and the right pixel column; and a demultiplexer switch configured to distribute the video signal, which is output from the source driver, to any given pair among the plurality of pairs.

5. The display device according to claim 1, further comprising a first switch and a second switch to serve as the switch, wherein the first switch switches whether to connect the left-pixel signal line either to the black voltage line or to the video signal line, and the second switch switches whether to connect the right-pixel signal line either to the black voltage line or to the video signal line.

6. The display device according to claim 5, further comprising:

a first switch signal line that supplies the first switch with a first switch signal that switches whether to connect the left-pixel signal line either to the black voltage line or to the video signal line; and a second switch signal line that supplies the second switch with a second switch signal that switches whether to connect the right-pixel signal line either to the black voltage line or to the video signal line.

7. The display device according to claim 1, wherein the display device includes a self-luminous display, and the black voltage includes a voltage of a black signal level for a self-luminous element provided for the self-luminous display.

8. The display device according to claim 1, wherein the display device includes a normally-black liquid crystal display, and the black voltage includes a voltage of a Vcom potential.

* * * * *